United States Patent Office 2,927,994
Patented Mar. 8, 1960

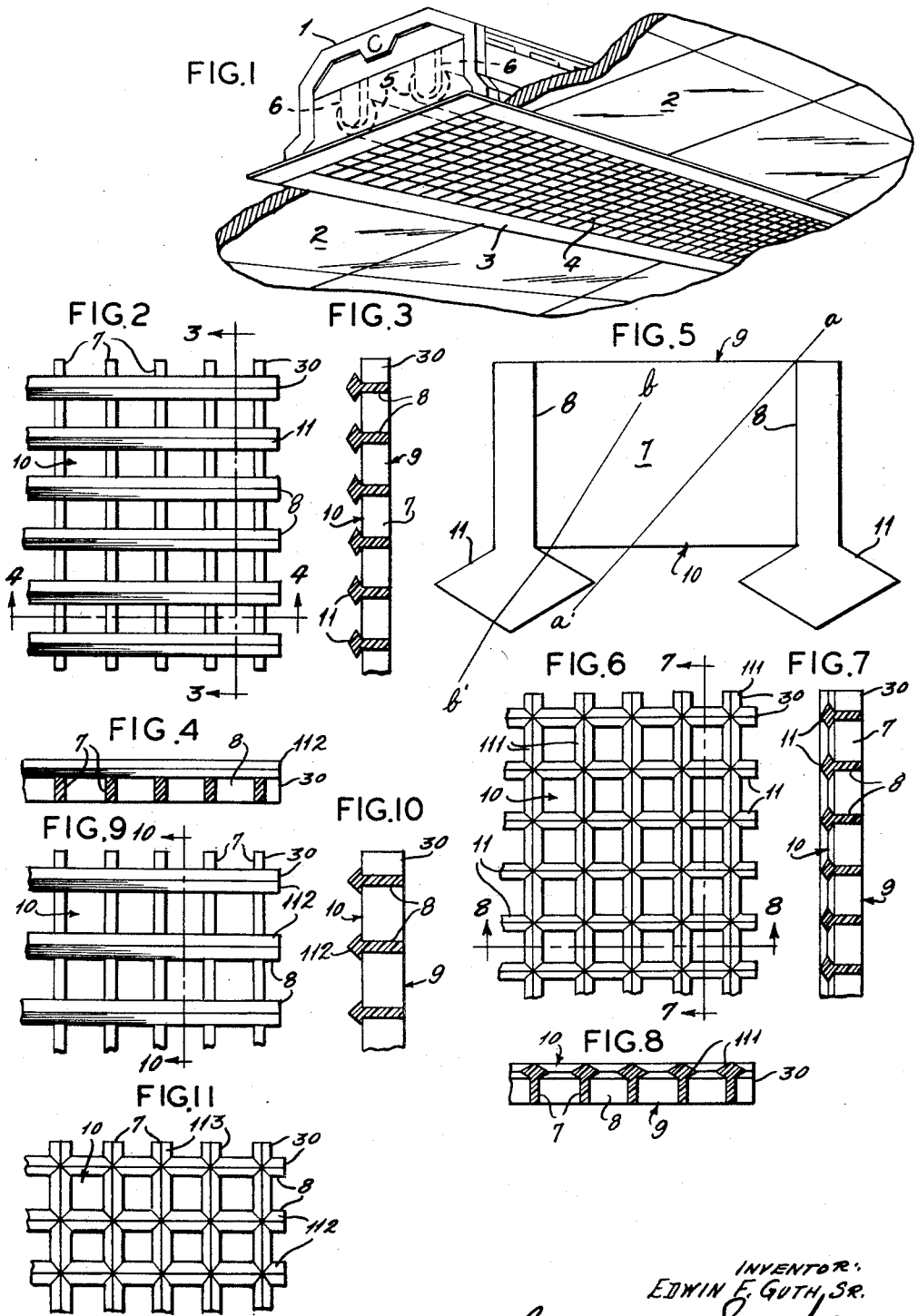

2,927,994

LIGHT DIFFUSORS FOR ILLUMINATING DEVICES

Edwin F. Guth, Sr., St. Louis County, Mo., assignor to The Edwin F. Guth Company, St. Louis, Mo., a corporation of Missouri Application April 12, 1957, Serial No. 652,582

6 Claims. (Cl. 240—78)

This invention relates generally to the control of light, and particularly to grids or lattices for use in connection with lighting fixtures and in other situations where it is desired to control light between the source thereof and the region upon which the illumination is desired.

In applicant's Patent No. 2,745,001, granted May 8, 1956, the lattice defines between the walls thereof a multiplicity of generally rectangular apertures adapted to control the light from a suitable light source and passing through the lattice. Such lattice in the embodiments described is of a molded material.

One of the objects of this invention is to provide a lattice so constructed as to cause dispersion of the light passing through the lattice at the light exits thereof.

Further objects will appear from the detail description in which will be described a number of embodiments of this invention; it is to be understood, however, that this invention is susceptible of various embodiments within the scope of the appended claims.

Generally stated, and in accordance with illustrative embodiments of this invention, the light controller comprises a lattice of light-transmitting material defining between the walls thereof a multiplicity of apertures, the walls being of a character and formed to cause dispersion of the light passing through the lattice at the light exits thereof. More particularly, the walls themselves are formed as lenses at the light exits to so disperse the light. In accordance with the illustrative embodiments of this invention, the walls adjacent the light exits are enlarged transversely of the lattice so as to refract the light and cause dispersion, and these enlargements may be of general diamond cross-section. The dispersion may be only in one direction or in two opposite directions with respect to the area of the lattice. However, the dispersion may be in transverse directions with respect to the area of the lattice; accordingly, in accordance with illustrative embodiments of this invention, the entire wall of each aperture at the light exit is enlarged transversely of the lattice. The light controller may be constructed in any suitable manner, but as a practical embodiment it is a molded lattice of a plastic light-transmitting material.

In the accompanying drawings:

Figure 1 is a perspective view of an illuminating device provided with a light controller constructed in accordance with this invention;

Figure 2 is a face view of one embodiment of the light controller;

Figure 3 is a section on the line 3—3 of Figure 2;

Figure 4 is a section along the line 4—4 of Figure 2;

Figure 5 is an enlarged diagrammatical detail showing the optical principles involved;

Figure 6 is a view similar to Figure 2, illustrating another embodiment of this invention;

Figure 7 is a section on the line 7—7 of Figure 6;

Figure 8 is a section on the line 8—8 of Figure 6;

Figure 9 is a view similar to Figure 2, but showing another embodiment of this invention;

Figure 10 is a section on the line 10—10 of Figure 9; and

Figure 11 is a view similar to Figure 6, but showing a modification of the form shown in Figure 9.

Referring to the accompanying drawings, and more particularly to Figure 1, 1 designates the fixture which may be supported in any suitable manner as in the ceiling 2 of a room. A frame 3 supports the light controlling lattice indicated generally at 4 in any suitable manner, as in Patent No. 2,745,001. The fixture is provided with one or more lamps 5 which may be of a fluorescent type or of an elongated filament type supported in receptacles 6. These lamps are, therefore, in a position to direct light on the top or entrance side of the lattice to issue at the bottom or exit side thereof. The fixture itself may be provided with reflectors (not shown) on the inside thereof to further direct the light toward the lattice.

Referring now to Figures 2–5, the lattice has a series of walls 7 and 8 which define therebetween a multiplicity of open spaces each terminating in an aperture 9 at one exterior surface (the upper face as shown) of the lattice, and an aperture 10 near the opposite surface or lower face. In this embodiment, apertures 9 and 10 are of substantially the same size and of generally rectangular form, more specifically, of square form. Outwardly of the aperture 10 or adjacent the lower face, the walls are, however, enlarged as shown at 11 and in the particular embodiment shown, these enlargements are of general diamond cross-section. As previously stated, this lattice may be molded of a light-transmitting material, and particularly a transparent material, so as to have the property of refracting light incident on the lens-like enlargement in a manner well-known as characterizing transparent structures whose index of refraction differs from that of the surrounding medium. Accordingly, it will be apparent that the walls of the lattice are in part of a slat-like character generally perpendicular to the main plane of the lattice, and are in part formed as lenses, the lens portions being disposed along the edges and in overhanging relationship with the other portions of the walls.

Figure 5 illustrates the optical principles of the lattice of Figures 2–4. As an example, the walls 7 and 8 are $\frac{1}{16}$ inch thick and $\frac{4}{16}$ inch in depth (vertical). The enlargements 11 are of diamond cross-section and are $\frac{3}{16}$ inch wide and $\frac{2}{16}$ inch in depth, so that the entire depth of the walls 7 and 8 plus enlargement 11 is $\frac{6}{16}$ inch. The spacings of the wall are likewise $\frac{9}{16}$ inch. In this particular embodiment, rays directed at various angles are indicated on the drawing. Beams from a lamp (not shown) located to the upper right of the two walls and enlargements, shown in Figure 5, will pass through the entrance (top) of the lattice and issue at the exits (bottom). A beam $a$ will pass directly through the aperture and, clearing the right edge of the enlargement 11, will not be refracted or dispersed. A beam $b$ will strike the enlargement 11 and in passing therethrough will be refracted, issuing as a refracted beam $b'$. The beams passing through the lattice which strike the enlargements 11 are, therefore, refracted so that the issuing light will be dispersed. Such dispersion will thus present the enlargements as illuminated and avoid the glare which would otherwise result.

In the embodiment shown in Figures 2–4, the light passing through the lattice will be dispersed in a zone along one dimension of the lattice, viz., along the direction of line 3—3 of Figure 2. That is sufficient for many purposes where the illuminating device is located so that it is seldom viewed in a direction parallel with walls 8.

Figures 6–8 disclose an embodiment in which the walls of the lattice are so formed as to cause dispersion of the light passing through the lattice at the light exits thereof in transverse directions with respect to the area of the lattice, that is, along the directions of both lines 7—7 and 8—8 of Figure 6. In this embodiment, the walls 7 and 8 are constructed as shown in Figures 2-4, and the enlargements 11 are present. In addition, walls 7 are provided with enlargements 111 so that all of the walls bounding an aperture are capable of dispersing light. The principle of operation of this lattice is the same as in Figure 5, except that the refraction of the light passing through the enlargements 111 will be dispersed in transverse directions with respect to the area of the entire lattice. Such a light controller is of advantage where it forms a large part of the ceiling of a room where it is subject to view in all directions.

Figures 9-10 illustrate another embodiment of this invention. The walls 7 and 8 are again formed as in the other figures. Enlargements 112 on walls 6 are of general diamond cross-section, except that they are truncated. The principle of operation is generally that illustrated in Figure 5, except that the refraction of the entering and issuing rays of light will be modified somewhat. In Figures 9 and 10, the dispersion of the light will be as in Figure 5.

In Figure 11, the enlargements 112 are again provided, but, in addition, walls 7 are provided with similar enlargements 113 so that the enlargements extend entirely around each aperture.

The light controllers may be constructed in any suitable manner, but as a practical embodiment, it is molded of a plastic light-transmitting material. The material may be glass or one of the transparent resins, such as polystyrene or methylmethacrylate, a commercial form of which is known as Lucite. The material may, however, be a translucent synthetic resin. Such synthetic resins lend themselves readily to molding under pressure in a sectional mold in which the mold surfaces can be highly polished. Likewise, although glass is more difficult to press in large areas than synthetic resins, the lattice can be made of an area which lends itself to pressing and the glass may then be annealed in any suitable manner. The pressing may be done in sectional molds of a character used in the making of artificial cut glass trays and bowls. Likewise, a synthetic resin, such as Lucite, may be pressed in sectional molds of the character employed in making tail-light reflectors for automobiles. Sections of the lattice may be placed end to end and side to side to form an area of any desired extent. In such a case, the projecting ends 30 of two lattices will form apertures.

Having thus described the invention, what is claimed and desired to be secured by Letters Patent is:

1. A light controller, comprising, a lattice of substantially parallel-sided walls defining a plurality of open apertures bounded respectively by substantially right-angularly related ones of said walls, at least some of said walls having an elongate lens located at the light exit side of said apertures, each such lens extending lengthwise of its associated wall and extending transversely outboard of the parallel sides of such wall substantially less than half the distance between adjacent parallel ones of said walls so as to reduce, but not close, said apertures at the light exit thereof.

2. The light controller of claim 1, wherein the lenses are integral with said walls.

3. The light controller of claim 1, wherein the exterior surface of each lens forms a vertex addressed outwardly from the lattice.

4. The light controller of claim 1, wherein the lenses are generally diamond shaped in cross-section.

5. The light controller of claim 1, wherein the lenses are triangular in cross-section.

6. The light controller of claim 1, wherein the walls extending both lengthwise and widthwise of said lattice have said lenses.

References Cited in the file of this patent

UNITED STATES PATENTS

| | | |
|---|---|---|
| 1,241,886 | Rowe | Oct. 2, 1917 |
| 2,398,624 | Decker | Apr. 16, 1946 |
| 2,506,951 | Doane | May 9, 1950 |
| 2,745,001 | Guth | May 8, 1956 |
| 2,756,325 | Zwick | July 24, 1956 |

FOREIGN PATENTS

| | | |
|---|---|---|
| 593,235 | Great Britain | Oct. 10, 1947 |